United States Patent
Duval

(10) Patent No.: US 10,086,443 B2
(45) Date of Patent: Oct. 2, 2018

(54) ROTARY CUTTING TOOL HAVING A CUTTING EDGE MADE OF MULTIPLE MATERIALS

(71) Applicant: Mecachrome France, Amboise (FR)

(72) Inventor: Laurent Duval, Meslay du Maine (FR)

(73) Assignee: Mecachrome France, Amboise (FR)

( * ) Notice: Subject to any disclaimer, the term of this patent is extended or adjusted under 35 U.S.C. 154(b) by 282 days.

(21) Appl. No.: 14/893,969

(22) PCT Filed: May 27, 2014

(86) PCT No.: PCT/FR2014/051236
§ 371 (c)(1),
(2) Date: Nov. 25, 2015

(87) PCT Pub. No.: WO2014/191673
PCT Pub. Date: Dec. 4, 2014

(65) Prior Publication Data
US 2016/0114409 A1 Apr. 28, 2016

(30) Foreign Application Priority Data
May 29, 2013 (FR) ...................................... 13 54887

(51) Int. Cl.
*B23B 51/02* (2006.01)
*B23C 5/02* (2006.01)
(Continued)

(52) U.S. Cl.
CPC ............... *B23B 51/00* (2013.01); *B23C 5/10* (2013.01); *B23C 5/1009* (2013.01); *B23D 77/00* (2013.01); *B23K 1/0008* (2013.01); *B23K 20/02* (2013.01); *B24B 3/06* (2013.01); *B24B 3/24* (2013.01); *B24B 3/26* (2013.01); *B23B 2226/18* (2013.01); *B23B 2240/08* (2013.01);
(Continued)

(58) Field of Classification Search
CPC . B23B 51/00; B23B 2226/18; B23B 2251/48; B23B 2251/14
See application file for complete search history.

(56) References Cited

U.S. PATENT DOCUMENTS 2,858,718 A 11/1958 Kohler
4,720,218 A * 1/1988 DeFries .................. B23B 51/00
407/1

(Continued)

FOREIGN PATENT DOCUMENTS

DE 3208282 A1 10/1982
DE 102008052743 A1 4/2010
(Continued)

OTHER PUBLICATIONS

International Search Report of PCT/FR2014/051236, dated Aug. 29, 2014.

*Primary Examiner* — Alan Snyder
(74) *Attorney, Agent, or Firm* — Banner & Witcoff, Ltd.

(57) ABSTRACT

The present invention relates to a multi-material rotary cutting tool (1) and a method for manufacturing such a tool that includes at least one continuous or substantially continuous cutting edge (8, 9) made of at least two different successive materials. The extremity or top (10) of the tool is a point off-centered in relation to the axis of rotation (5) of the tool.

8 Claims, 3 Drawing Sheets

(51) Int. Cl.
- *B23B 51/00* (2006.01)
- *B23C 5/10* (2006.01)
- *B23D 77/00* (2006.01)
- *B24B 3/06* (2006.01)
- *B24B 3/24* (2006.01)
- *B24B 3/26* (2006.01)
- *B23K 1/00* (2006.01)
- *B23K 20/02* (2006.01)

(52) U.S. Cl.
CPC ....... *B23B 2240/11* (2013.01); *B23B 2240/16* (2013.01); *B23B 2251/14* (2013.01); *B23C 2210/03* (2013.01); *B23C 2226/18* (2013.01); *B23C 2240/08* (2013.01); *B23C 2240/16* (2013.01); *B23D 2277/02* (2013.01)

(56) References Cited

U.S. PATENT DOCUMENTS

| | | | | |
|---|---|---|---|---|
| 6,012,881 | A * | 1/2000 | Scheer | B23B 31/008 408/145 |
| 2010/0221078 | A1* | 9/2010 | Borschert | B23B 51/009 408/1 R |
| 2013/0017028 | A1* | 1/2013 | Fang | B23B 51/02 408/144 |

FOREIGN PATENT DOCUMENTS

| | | |
|---|---|---|
| EP | 2457678 A1 | 5/2012 |
| JP | 2000043006 A | 2/2000 |

* cited by examiner

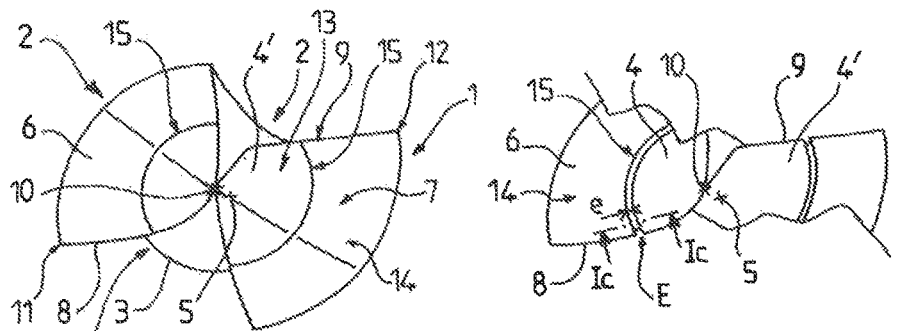
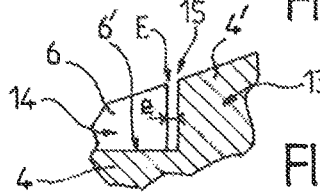
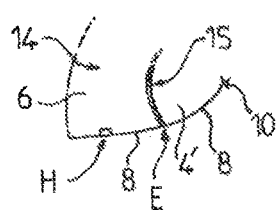
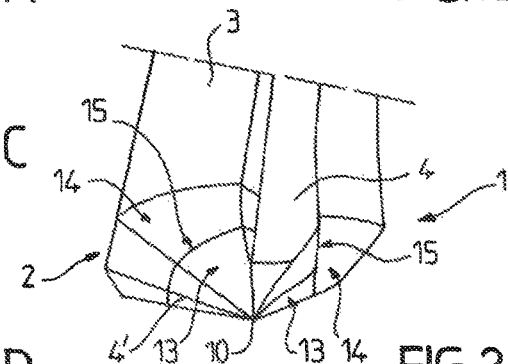
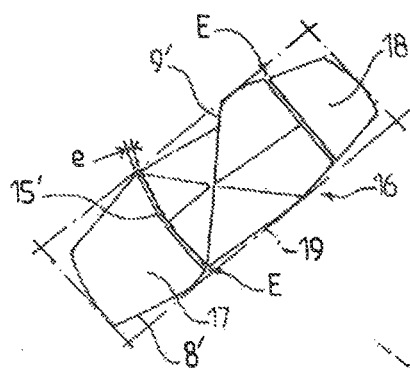
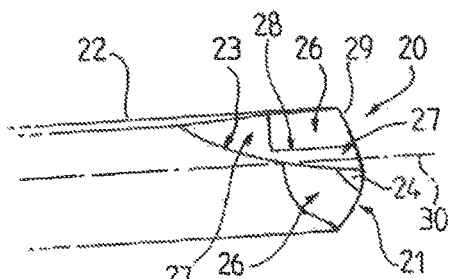
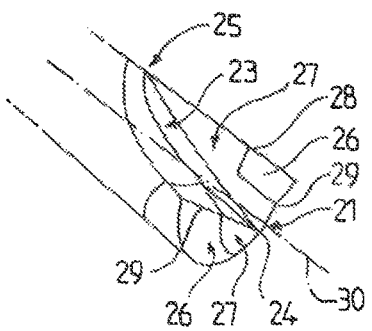

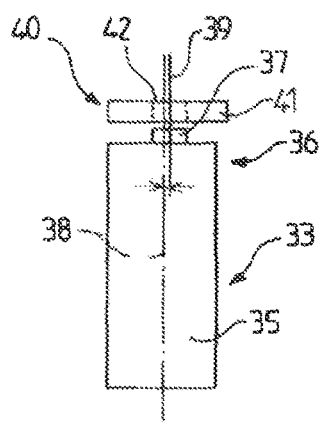
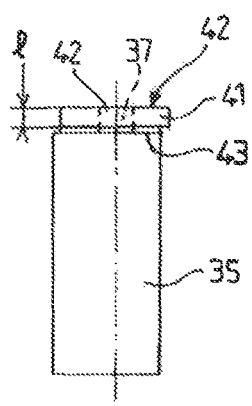
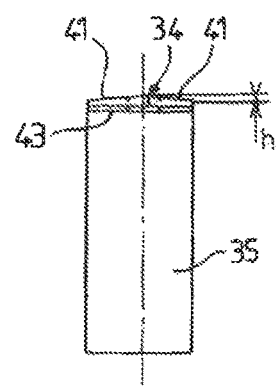
FIG.6A    FIG.6B    FIG.6C
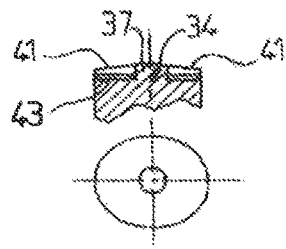
FIG.7
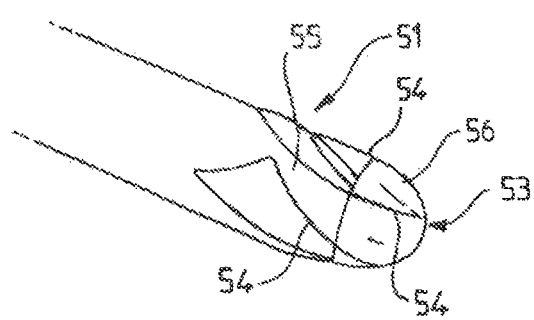
FIG.9
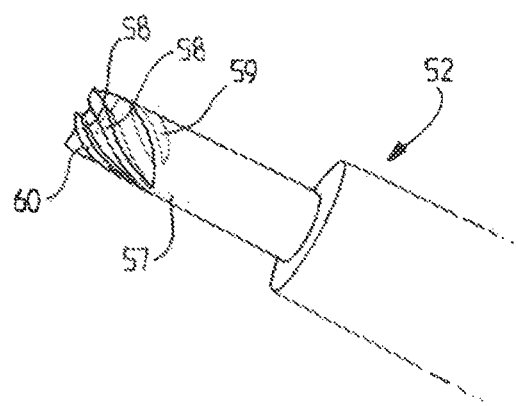
FIG.10

ROTARY CUTTING TOOL HAVING A CUTTING EDGE MADE OF MULTIPLE MATERIALS

The present invention relates to a composite rotary cutting tool.

It also relates to a method for manufacturing such a tool.

It is in particular, but not exclusively, used in the domain of machining, and notably in cutting by stock removal, such as boring, milling and drilling.

To do so, it is known to use single-material tools designed for a specific, preferred cutting condition, such as cutting speed, admissible temperature for the tool, acceptable wear and fragility of the tool, cost, etc.

However, such devices have drawbacks.

Indeed, the choice of the specific, preferred condition is made to the detriment of other conditions.

For example, it is known to make rotary cutting tools of metal or carbide. These tools provide high mechanical strength for a reduced cost and support low rotation speeds.

It is also known to use brazed multi-material tools including a ceramic or diamond portion such as cubic boron nitride (CBN) or polycrystalline diamond (PCD), as well as WC/steel drills or PCD/WC or CBN/WC inserts (WC being the symbol for tungsten carbide).

However, this type of tool has low wear strength. They also work within a limited range of usage conditions, i.e. limited in terms of desirable conditions.

It is also known to use ceramic cutting tools.

Such tools provide better cutting performance than carbide and enable high-speed machining, notably on account of the thermal resistance of same, withstanding heating during use.

However, this type of tool is more fragile and brittle, in particular during use at low speeds. It is also more expensive than carbide.

To overcome these drawbacks, it is proposed to make a body from a mechanically strong and resilient material such as metal or a material with metal binder, topped with a cutting head made of a material providing better performance, such as ceramic.

However, this solution also has drawbacks.

It involves complex geometric constraints, notably on account of the fragility of the join between the metal or material with metal binder and the ceramic between the cutting head and the remainder of the body, which needs to be compensated by a specific formation of the tool.

Furthermore, it proposes a tool in which the cutting portion is still single-material and therefore does not enable use of the features related to both materials to optimize cutting.

Finally, dual-material tools having continuous edges made of at least two different materials are known (DE 10 2008 052 743, JP 2000 043 006, U.S. Pat. No. 2,858,718).

Such tools, which were first described in 1955 (U.S. Pat. No. 2,858,718) are however limited by the very design of same, being symmetrical and obtained by welding two materials together.

The present invention is intended to provide a rotary cutting tool that satisfies practical requirements better than previously known tools, in particular in that it enables the simultaneous execution, using a single cutting profile, of machining operations using different materials, each one being arranged according to the related optimum usage conditions, and furthermore, in particular by improving the entry of the part to be machined at low speeds, on account of the off-centering between the tip of the tool and the axis of rotation.

With the invention, and on account notably of optimization of the cutting conditions enabled by such a tool, it is possible to considerably improve cutting-speed performance. For example, depending on the material to be machined, the performance of a tool in terms of the cutting speed of same can be increased by around 800% for drilling into cast iron (increase from 120 m/min to 1000 m/min for a tool of diameter not exceeding 30 mm, for example) and by 2600% for milling nickel-based alloys (linear cutting speed $V_c$ increasing from 30 m/min to 800 m/min for a tool of diameter not exceeding 25 mm).

For this purpose, the invention essentially proposes a multi-material cutting tool having at least one continuous or substantially continuous cutting edge comprising at least two successive different separate materials, the tool comprising an elongate core about an axis (axis of rotation) and at least one lip or thread crowned with a continuous or substantially continuous cutting edge, the middle or inner radial portion of the core and the distal portion (i.e. the portion closest to the axis) of the lip or thread being made of a first material enabling a low cutting speed ($V_c<50$ m/min and notably $V_c<30$ m/min) and the periphery or outer radial portion of the core of the tool and the proximal portion of the lip crowned with said corresponding cutting edge being made of a second material enabling a high cutting speed ($V_c>500$ m/min and notably $V_c>700$ m/min).

The continuous or substantially continuous cutting edge is as a whole radial in relation to the axis of rotation of same and is formed of the first material (for example: metal) in the zone closer to the axis of rotation, and of the second material (for example: ceramic) in the zone further away from the axis.

The tool according to the embodiment described in greater detail herein is noteworthy in that the extremity or top of the tool is off-centered in relation to the axis of rotation of the tool.

Advantageously, the tool is a drill.

"Substantially continuous" means an edge with a small longitudinal discontinuity less than 5 mm wide. In other words, the edge has a cutout at the interface of the different materials along the edge that is less than 5 mm wide, for example 2 mm or less. It should be noted that the cutout may be formed deliberately or result from the assembly method of the materials.

"Different separate materials" means two materials that are independent of one another, that are not integrated or mixed together, as is the case with an alloy.

The association of two or more materials, which will necessarily have different characteristics, makes it possible to use the tool at the maximum possible cutting speed of same, notably by providing a peripheral material that enables a high cutting speed and a material in the middle of the tool for lower speeds or a zero speed of rotation.

"Enabling a low or high speed" means enabling use without abnormal breakage or wear under nominal usage conditions for the tool determined by the person skilled in the art in accordance with his basic knowledge, in particular in consideration of the configuration of the tool.

Rotary tools are driven in rotation about an axis by a machine chuck and rotate at a given rotational frequency for a given cutting speed.

The linear speed at a point C of the tool varies as a function of the position of same on the radius of the tool.

It is equal to $V_c = N \times 2\pi R$, where N is the rotational frequency (for example in revolutions per minute) and R is the distance from point C from the axis of rotation of the tool.

"Enabling a low or high cutting speed" means a material that behaves acceptably, in the opinion of the person skilled in the art, under nominal usage conditions at these speeds, in the absence of any manufacturing defects in the material (such as scale), i.e. without abnormal breakage or wear other than that related to use according to professional standards (adequate lubrication, pressure and temperature exerted and/or obtained within the ranges recommended by the material manufacturer, etc.).

As a result, the invention makes it possible to optimize the choice of material as a function of the position of same in relation to the axis of the tool (which is the same as the axis of rotation) and therefore the linear speed applied to same.

In advantageous embodiments, either of the following arrangement can also be used:
- one of the materials is a metal or carbide-based material with metal binder such as tungsten/cobalt carbide (WC/Co, cobalt (Co) making up 5-25% by mass) and the other material is a ceramic material or a ceramic-matrix composite material.

The ceramic is for example silicon nitride. The metal or carbide-based material enables a low cutting speed at the center without being brittle ($V_c < 30$ m/min, for example), while the ceramic material, for example silicon nitride, enables high cutting speeds at the periphery on account of the hardness of same ($V_c > 800$ m/min).

On the other hand, it becomes brittle at low or zero speeds.
- the first material is less brittle than the second material under the same usage conditions;
- the tool has an elongate core about an axis (of rotation) and at least two lips each crowned with a continuous or substantially continuous cutting edge, said cutting edges being joined at the extremities of same to form the top of the drill. Advantageously, the tool has three lips;
- the tool has a chipbreaker notch on the cutting edge at the interface between materials;
- the chipbreaker notch on the cutting edge is offset in relation to the interface between materials;
- the extremity of the tool, forming a milling cutter, having at least one thread extending along the axis of rotation of the tool and/or to the end of said tool, the thread forms a continuous or substantially continuous cutting edge, the distal portion of which is made of the first material, for example metal or a material with metal binder, and the proximal portion of which is made of the second material, for example ceramic. The general shape of the extremity of the tool, forming a milling cutter, may be tapered, cylindrical or hemispheric with a straight or substantially helical thread;
- the metal material or material with metal binder is tungsten carbide with cobalt binder, or the steel alloy known as high-speed steel (HSS);
- the cutting edge is continuous;
- the cutting edge is substantially continuous and has a cutout between the different materials of width e between 0.01 mm and 3 mm, for example less than 2 mm;
- the tool has a cutting edge made of at least three different successive materials;
- the different materials are attached together by high-temperature vacuum brazing (>700° C., for example around 800° C.);
- the different materials are attached using a method based on pulses of a charge or an electrical current combined with pressure.

The invention also relates to a method for manufacturing a composite rotary cutting tool as described above.

It also relates to a method for manufacturing an elongate cutting tool about an axis that can be rotary about said axis, in which, using a longitudinal bar made of a first material and at least one plate of thickness 1 of a different material, the plate is positioned on one extremity of the bar having a joining surface shaped to match the extremity of said bar, same being assembled by brazing or hooping or diffusion welding, or by pulsing an electric current or a charge into a powder, before the bar and plate so assembled are cut by grinding the cutting angles at a sufficient height h to obtain at least one continuous or substantially continuous cutting edge made of two materials, characterized in that the extremity of the bar is cylindrical and includes a tenon having a section that is smaller than the diameter of the bar, and the plate has a recess the shape of which matches said tenon, which is inserted therein before assembly, the plate and the bar being cut at a height h<l to form a head (tool drill or milling cutter) the top of which is made of the first material of the tenon and at least one portion of the remainder of the cutting edge is made of the different material.

More specifically, as the tenon is off-centered in relation to the axis of the tool, the tool (the drill) is formed with a cutting edge in which the multi-material zones located on either side of the tip of the drill passing through the axis of the tool (and the axis of rotation of same) are not of equal length.

Advantageously, the materials are assembled by high-temperature vacuum brazing at 700° C.

Also advantageously, assembly is carried out using pulses of a charge or of an electrical current with certain materials in powder form and/or other solid elements.

Advantageously, the aforementioned assembly step is followed by or concomitant with a pressurization step of the tool by pressing, such as to cause overlapping or upsetting of a material or the materials on or in the other, including after cooling. This guarantees continuity of the edge.

In this case, the person skilled in the art determines, as a function of the form of the material (powder, solid pieces) and the grades of the materials used for the tool, the current and/or voltage values and the characteristics of same in a known manner for powder technologies or technologies known to the person skilled in the art as spark plasma sintering (SPS) or pulsed electric current sintering (PECS).

In another advantageous embodiment, a chipbreaker notch is formed on the cutting edge at a different position of the interface between the two materials.

The notch may also be formed at the interface.

The invention is further explained in the description below of different embodiments given by way of non-limiting examples. The description relates to the attached drawings, in which:

FIG. 1A is a top view of a drill extremity according to a first embodiment of the invention.

FIG. 1B is a partial top view of a drill extremity according to a second embodiment of the invention.

FIG. 1C is a cross section along IC-IC in FIG. 1B, level with the cutout.

FIG. 1D is a partial view of a cutting edge with chipbreaker notch H according to an embodiment of the invention.

FIG. 2 is a perspective view of the drill extremity in FIG. 1.

FIG. 3 is a top view of another embodiment of a drill according to the invention.

FIGS. 4 and 5 are respectively a side view and a perspective view of a drill extremity of another embodiment according to the invention.

FIGS. 6A to 6C show schematically the steps of an embodiment of a method for manufacturing a tool for drilling according to the invention.

FIG. 7 is a cross section and top view of the extremity of the drill obtained with reference to FIGS. 6A to 6C.

FIGS. 9 and 10 are perspective views of two different embodiments of a milling tool with a hemispherical head (FIG. 9) and a cylindrical or tapered head (FIG. 10) respectively.

Figure 8A:
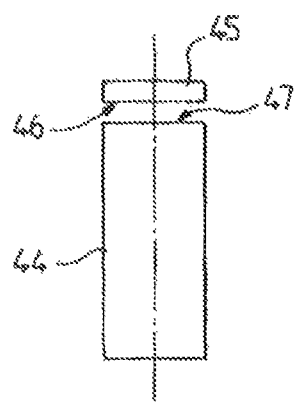
FIGS. 8A to 8C show schematically the steps of another method for manufacturing a tool for milling.

FIGS. 1A and 2 are top and perspective views of a drill 1 having a head 2 forming the cutting extremity of the tool, and a body 3, that is for example cylindrical, enabling the tool to be held and rotated.

In the embodiment explained in greater detail herein, the tool has a cylindrical core 4 made of tungsten carbide with cobalt binder, provided with a cylindrical extremity 4' and two flanges or lips 6 and 7 each crowned with a cutting edge 8 and 9 that are joined at the extremities or tops 10 of the drill off-centered in relation to the center 5 of the extremity 4' of the core.

In the embodiment described in greater detail here, on account of the off-centering (in relation to the center 5) of the extremity 10, through which the axis of rotation of the tool passes, the edge portions of a material are not of equal length, the edge being conversely of substantially identical shape (in rotation in relation to the tip 10) and have for example a squashed S shape.

The lips 6 and 7 form, in a known manner, the helical tapered inclined surface of the peripheral extremities of the drill.

According to the embodiment of the invention described in greater detail here, the lips have a continuous edge 8, 9 from the tip 10 to the peripheral radial extremity 11 and 12, said edge being multi-material.

In this case, the cutting edges 8 and 9 are therefore continuous and are as a whole radial in relation to the axis of rotation passing through the top 10 of the drill.

Each edge is a cutting edge and enables material to be removed when using the tool.

More specifically, each edge (see FIG. 2) is made of the metal material 13 or material with metal binder forming the core 4 and the extremity 4' of same, and the portion of the lips closest to the center 5 (distal or inner part), the two forming the middle or inner radial part of the tool, and a second ceramic material 14 that is more brittle but has greater thermal resistance, forming the outer radial portion of the tool with the portion of the lips furthest away from the axis (outer or proximal portion).

Each edge has an edge portion made of one material and another portion made of another material.

The edge portions made of the same material in each edge are also of different length.

The materials 13 and 14 separated by the join line 15 are rigidly connected together, for example by high-temperature vacuum brazing, as described below with reference to the method described in greater detail.

Henceforth in FIGS. 1B to 1D, the same reference signs are used to identify the same or similar elements.

FIG. 1B is a partial top view of a drill that has two substantially continuous cutting edges 8 and 9 with a discontinuity or cutout E of width e, for example 1 mm.

This cutout is found identically along the entire join 15 between the materials of the extremity 4' of the core 4 and of the remainder of the flanges or lips 6 and 7.

FIG. 1C is a cross section of the cutout E along $I_c$-$I_c$ in FIG. 1B.

The material, for example ceramic, of the flange 6 is attached to the core 4 at 6', for example by brazing.

FIG. 1D shows another embodiment of the cutting edge 8 in FIG. 1B with a chipbreaker notch H on the edge, but removed from the cutout E.

In another embodiment, H may also be superposed on E.

By way of example, and for a predefined use, the depth of H is greater than the turning advance value, i.e. the penetration length of the tool into the part along the axis of rotation of the tool for one revolution, in order to ensure chip breaking. This results in cutting of the part being machined, with no discontinuity.

FIG. 3 shows a drill 16 according to another embodiment of the invention in which the flanges 17, 18 or peripheral parts are not inscribed within a cylinder, but within a parallelepiped (dot-dash line 19).

In this case, the cutting edges 8', 9' are substantially continuous, i.e. they have a cutout E of width e, for example of 2 mm. The join line 15' then forms a slot of any section, for example rectangular, and of a depth corresponding to the thickness of the peripheral material.

FIGS. 4 and 5 show another embodiment of a drill 20 according to the invention. It includes a cutting head 21 and a metal cylindrical body 22.

The body of the tool and the head include a recess 23 forming a chip pocket having, in a known manner, a curved surface from the extremity of the head or tip of the drill 24 to a zone 25 upstream of the head.

In this embodiment, the second material 26, which is different from the first material 27, is separated from this latter by a join line (surface) 28 and has a single cutting edge 29, the axis of rotation of the tool 30 being offset from the tip 24 of the drill, which acts as an auger.

A method for manufacturing the drill shown in FIGS. 1A and 2 is described below with reference to FIGS. 6A to 6C and 7.

It involves at least two elements made of different materials.

The first element 33 is ultimately intended to form the body and the core 34 (see 6C) of the head of the tool. It is initially, for example, in the form of a metal cylindrical bar 35, for example made of tungsten carbide alloy with cobalt binder.

A first operation involves reducing the diameter of a portion of the extremity 36 of the cylindrical bar such as to form a cylindrical tenon 37 with a section of reduced diameter, which projects from the extremity with an annular flat surface.

The tenon is for example off-centered in relation to the rotational axis of symmetry 38 of the bar.

The gap between the axis of the tenon 39 and the axis of symmetry 38 is between 0% and 50% of the diameter, for example 15%.

The second element 40 is intended to form the outer radial part of the lips or peripheral portions.

It is formed for example by a cylindrical disk 41, for example made of ceramic, having the same diameter as the bar.

The disk 41 has a through hole or recess 42 centered complementarily on the tenon, i.e. having a diameter enabling insertion of the tenon 37.

Once the tenon has been inserted into the hole (FIG. 6B), the assembly, in the example described in greater detail here, forms a cylinder with an off-center head, and the tenon may even be flush with or project from the upper surface 42 of the disk.

The two materials are then assembled to ensure continuity of the material, i.e. they are for example assembled using any mechanical or metallurgical method ensuring a strong link, such as brazing, hooping, diffusion welding or using powder metallurgy.

This link is symbolized in the figures using a double line 43, which does not necessarily indicate that said link has a visible thickness.

Advantageously, high-temperature vacuum brazing is used in this case (notably 800° C.)

Also advantageously, the assembly may be carried out using spark plasma sintering (SPS) or pulsed electric current sintering (PECS) methods. SPS and PECS are based on square-wave high-intensity pulses of a charge or of an electrical current.

These techniques enable rapid, localized diffusion welding and/or sintering with a high temperature-increase speed that is nonetheless short lived with little or no crystal growth.

This temperature distribution enables the formation of very compact articles at lower overall temperatures.

Assembly also includes a pressurization step of the tool by pressing (not shown).

Such high-pressure, compression and application of electrical current force the diffusion welding. Compression of one part into the other results in overlapping of said parts on to one another, including after cooling. It may also result in upsetting of hot material from the tenon pressed in this way. Upsetting then fills the internal discontinuities of the join, i.e. it brings material to the interface of the two materials.

The interface thus forms a continuous assembly of material.

The length of the slot can therefore be further reduced, including to zero, thereby ensuring the continuity of the edge.

The mechanical strength of the link against impacts is therefore also greater at the interface on account of the continuity of the interface join. This increased strength enables the notch or slot to be positioned, in the embodiments where it is present, away from the radial periphery of the interface but anywhere on the edge.

In such an embodiment, the tenon may be centered.

The bar/disk assembly is then machined (FIGS. 6C and 7) to form the dual-material continuous-edge drill, the tenon 37 in this case forming the extremity of the core 34 of the head.

Figure 8B:
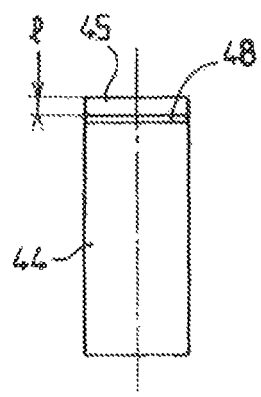
Figure 8C:
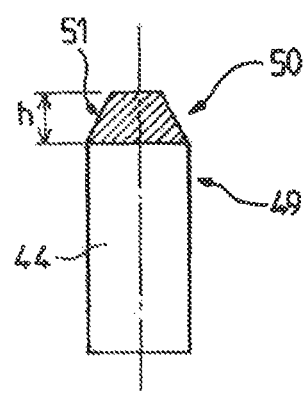

Another method for manufacturing a rotary cutting tool is described with reference to FIGS. 8A to 8C, in this case for manufacturing a milling cutter.

In this case, the tool is also obtained from a cylindrical bar 44, for example made of a WC alloy with cobalt binder and a corresponding full ceramic disc 45.

The cylindrical bar 44 and the disk 45 of thickness 1 have flat surfaces 46, 47 that cooperate with one another at the extremities of same.

These two elements are assembled (FIG. 8B) using means such as those mentioned above, i.e. for example by high-temperature vacuum brazing (double line 48).

The tool is then formed (see schematic representation in FIG. 8C) in the cylindrical assembly 49 of the bar and the disk, creating longitudinal recesses 50 forming at least one edge 51 at a height h of a length greater than the thickness of the disk 1.

FIGS. 9 and 10 show respectively two milling cutters 51 and 52 obtained using the method described with reference to FIGS. 8A to 8C.

FIG. 9 shows a cylindrical milling cutter 51 having a hemispherical head 53 and dual-material helical cutting edges 54 made of ceramic 55 and metal 56.

The length of the continuous cutting edge 54 is greater than the thickness of the material used to form the extremity of the head.

The milling cutter 52 has a tapered head 57 provided with composite helical cutting edges 58.

The cutting edge then runs from the extremity of the head to the other extremity of the different materials 59 and 60 successively.

The use of a tool according to the invention is described below, for example with reference to the drill in FIG. 1.

The rotary cutting tool is then assembled on a turning motor (not shown).

Assembly can be carried out by attaching the cylindrical body 3 of the tool using any known mechanical means (Morse taper, etc.).

Once put into rotation, the tool is brought into contact with the mechanical part to be machined.

The first portion of the tool to come into contact with the part is the extremity or tip of the head 2 made of metal or a material with metal binder.

This has a low rotation speed, which gets lower as it approaches the axis 10 of rotation, where it reaches zero.

The material chosen for the core is selected to be efficient at low speed and not very brittle, and enables an initial penetration of the tool in the part. In the embodiments described in greater detail, this material is metal, metal alloy, or tungsten carbide with metal binder.

The peripheral portions or flanges (lips) 6 and 7 come into gradual contact with the part as the tool enters the part.

As the points of these peripheral portions are increasingly radially distant from the axis of rotation 10, they have a rotational speed much higher than the rotational speed of the points on the core 4. The use of a more efficient but more brittle material, such as ceramic, from a certain distance from the axis 10 enables the exceptional performance levels observed to be obtained.

The distance to be observed for the change of material from the axis is determined by the person skilled in the art as a function of the desired performance levels in consideration of the operating speeds used.

However, for example and advantageously, the ratios (on the radius of the drill or of the reamer) between the first central material and the second outer material is ⅓; ⅔ or ½; ⅓ or ⅔; ⅓.

Thus, according to the invention and as the mechanical part is penetrated, each part of the tool is working in the rotational speed conditions most suited to the composition of same.

Naturally, and in consideration of the foregoing, the present invention is not limited to the embodiments described in greater detail. On the contrary, it encompasses all of the variants and in particular those relating to the dimensions of the tools, which could be anything, and those in which three, four or five materials are used, in particular by stacking discs of different materials, those in which the shape of the drills and/or of the reaming tools is different and/or for example the cores, bars and tenons are not cylindrical, and those in which the materials are different, for example two metal materials having different characteristics.

The invention claimed is:

1. A multi-material cutting tool having a body and a head with a height h and at least one continuous or substantially continuous cutting edge comprising at least two successive different materials, the tool comprising an elongate core about an axis and at least one lip or thread crowned with a continuous or substantially continuous cutting edge, the middle or inner radial portion of the core and the distal portion of the lip or thread being made of a first material enabling a low cutting speed ($V_c$<50 m/min) and the periphery or outer radial portion of the core of the tool and the proximal portion of the lip or of the thread crowned with the corresponding cutting edge being made of a second material enabling a high cutting speed ($V_c$<500 m/min), the continuous or substantially continuous cutting edge being overall radial to the axis of rotation of the tool and comprising the first material in the zone closest to the axis of rotation and the second material in the zone further away from the axis, characterized in that the body is made of the first material and in that the core is off-centered in relation to the axis of rotation of the tool.

2. The tool as claimed in claim 1, characterized in that one of the materials is a metal or carbide-based material with metal binder and the other material is a ceramic material or a ceramic-matrix composite material.

3. The tool as claimed in claim 2, characterized in that the material with metal binder is tungsten carbide with cobalt binder.

4. The tool as claimed in claim 1, characterized in that it has a chipbreaker notch on the cutting edge at the interface between materials.

5. The tool as claimed in claim 1, characterized in that it has a chipbreaker notch on the cutting edge that is offset from the interface between materials.

6. The tool as claimed in claim 1, characterized in that it has a cutting edge made of at least three different successive materials.

7. The tool as claimed in claim 1, characterized in that the cutting edge is substantially continuous and has a cutout between the different materials of width e of less than 2 mm.

8. The tool as claimed in claim 1, characterized in that the cutting edge is continuous.

* * * * *